(12) United States Patent
Burges et al.

(10) Patent No.: US 7,689,615 B2
(45) Date of Patent: Mar. 30, 2010

(54) RANKING RESULTS USING MULTIPLE NESTED RANKING

(75) Inventors: Christopher J. Burges, Bellevue, WA (US); Irina Matveeva, Chicago, IL (US); Leon C. W. Wong, Redmond, WA (US); Andrew S. Laucius, Seattle, WA (US); Timo Burkard, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 140 days.

(21) Appl. No.: 11/294,269

(22) Filed: Dec. 5, 2005

(65) Prior Publication Data
US 2006/0195440 A1 Aug. 31, 2006

Related U.S. Application Data

(63) Continuation-in-part of application No. 11/066,514, filed on Feb. 25, 2005.

(51) Int. Cl.
G06F 7/00 (2006.01)
G06F 17/30 (2006.01)

(52) U.S. Cl. .................. 707/723; 707/722; 707/706
(58) Field of Classification Search ............. 707/1, 707/3, 5
See application file for complete search history.

(56) References Cited

U.S. PATENT DOCUMENTS

| | | | |
|---|---|---|---|
| 5,493,692 A | 2/1996 | Theimer et al. |
| 5,544,321 A | 8/1996 | Theimer et al. |
| 5,555,376 A | 9/1996 | Theimer et al. |
| 5,603,054 A | 2/1997 | Theimer et al. |
| 5,611,050 A | 3/1997 | Theimer et al. |
| 5,625,751 A | 4/1997 | Brandwajn et al. |
| 5,649,068 A | 7/1997 | Boser et al. |
| 5,812,865 A | 9/1998 | Theimer et al. |
| 6,260,013 B1 | 7/2001 | Sejnoha |
| 6,466,232 B1 | 10/2002 | Newell et al. |
| 6,513,046 B1 | 1/2003 | Abbott, III et al. |

(Continued)

FOREIGN PATENT DOCUMENTS

WO  9800787  1/1998

OTHER PUBLICATIONS

Storn, et al., "Differential Evolution—A Simple and Efficient Heuristic for Global Optimization over Continuous Spaces", 1996.

(Continued)

*Primary Examiner*—Tony Mahmoudi
*Assistant Examiner*—Dennis Truong
(74) *Attorney, Agent, or Firm*—Lee & Hayes, PLLC

(57) ABSTRACT

A unique system and method that facilitates improving the ranking of items is provided. The system and method involve re-ranking decreasing subsets of high ranked items in separate stages. In particular, a basic ranking component can rank a set of items. A subset of the top or high ranking items can be taken and used as a new training set to train a component for improving the ranking among these high ranked documents. This process can be repeated on an arbitrary number of successive high ranked subsets. Thus, high ranked items can be reordered in separate stages by focusing on the higher ranked items to facilitate placing the most relevant items at the top of a search results list.

17 Claims, 11 Drawing Sheets

U.S. PATENT DOCUMENTS

| | | | |
|---|---|---|---|
| 6,526,440 B1* | 2/2003 | Bharat | 709/219 |
| 6,549,915 B2 | 4/2003 | Abbott, III et al. | |
| 6,636,860 B2* | 10/2003 | Vishnubhotla | 707/100 |
| 6,691,106 B1 | 2/2004 | Sathyanarayan | |
| 6,738,678 B1* | 5/2004 | Bharat et al. | 700/48 |
| 6,747,675 B1 | 6/2004 | Abbott et al. | |
| 6,785,676 B2 | 8/2004 | Oblinger | |
| 6,791,580 B1 | 9/2004 | Abbott et al. | |
| 6,801,223 B1 | 10/2004 | Abbott et al. | |
| 6,812,937 B1 | 11/2004 | Abbott et al. | |
| 6,842,877 B2 | 1/2005 | Robarts et al. | |
| 6,873,990 B2 | 3/2005 | Oblinger | |
| 6,968,333 B2 | 11/2005 | Abbott et al. | |
| 7,249,058 B2* | 7/2007 | Kim et al. | 705/26 |
| 7,281,002 B2* | 10/2007 | Farrell | 707/3 |
| 7,305,381 B1 | 12/2007 | Poppink et al. | |
| 2001/0040590 A1 | 11/2001 | Abbott et al. | |
| 2001/0040591 A1 | 11/2001 | Abbott et al. | |
| 2001/0043231 A1 | 11/2001 | Abbott et al. | |
| 2001/0043232 A1 | 11/2001 | Abbott et al. | |
| 2002/0032689 A1 | 3/2002 | Abbott, III et al. | |
| 2002/0044152 A1 | 4/2002 | Abbott, III et al. | |
| 2002/0052930 A1 | 5/2002 | Abbott et al. | |
| 2002/0052963 A1 | 5/2002 | Abbott et al. | |
| 2002/0054130 A1 | 5/2002 | Abbott, III et al. | |
| 2002/0054174 A1 | 5/2002 | Abbott et al. | |
| 2002/0069190 A1* | 6/2002 | Geiselhart | 707/1 |
| 2002/0078204 A1 | 6/2002 | Newell et al. | |
| 2002/0080155 A1 | 6/2002 | Abbott et al. | |
| 2002/0080156 A1 | 6/2002 | Abbott et al. | |
| 2002/0083025 A1 | 6/2002 | Robarts et al. | |
| 2002/0083158 A1 | 6/2002 | Abbott et al. | |
| 2002/0087525 A1 | 7/2002 | Abbott et al. | |
| 2002/0099817 A1 | 7/2002 | Abbott et al. | |
| 2002/0152190 A1 | 10/2002 | Biebesheimer et al. | |
| 2002/0188589 A1 | 12/2002 | Salmenkaita et al. | |
| 2003/0046401 A1 | 3/2003 | Abbott et al. | |
| 2003/0154476 A1 | 8/2003 | Abbott, III et al. | |
| 2003/0187844 A1* | 10/2003 | Li et al. | 707/7 |
| 2003/0225750 A1* | 12/2003 | Farahat et al. | 707/3 |
| 2003/0236662 A1 | 12/2003 | Goodman | |
| 2005/0034078 A1 | 2/2005 | Abbott et al. | |
| 2005/0049990 A1 | 3/2005 | Milenova et al. | |
| 2005/0125390 A1 | 6/2005 | Hurst-Hiller et al. | |
| 2005/0144158 A1* | 6/2005 | Capper et al. | 707/3 |
| 2005/0246321 A1* | 11/2005 | Mahadevan et al. | 707/3 |
| 2007/0043706 A1 | 2/2007 | Burke et al. | |
| 2007/0112720 A1* | 5/2007 | Cao et al. | 707/1 |
| 2007/0124297 A1 | 5/2007 | Toebes | |

OTHER PUBLICATIONS

Xia, et al., "A One-Layer Recurrent Neural Network for Support Vector Machine Learning", 2004.

Cohen, et al., "Volume Seedlings", 1992.

Storn, "On the Usage of Differential Evolution for Function Optimization", 2002.

Jarvelin, et al., Cumulated Gain-Based Evaluation of IR Techniques, 2002.

International Search Report and Written Opinion dated Mar. 6, 2008 for PCT Application Serial No. PCT/US06/26266, 11 pages.

Baum, et al. "Supervised Learning of Probability Distributions by Neural Networks" (1988) Neural Information Processing Systems, pp. 52-61.

Bradley, et al. "The Rank Analysis of Incomplete Block Designs 1: The Method of Paired Comparisons" Biometrika (1052) 39, pp. 324-245.

Kimeldorf, et al., "Some results on Tchebycheffian Spline Functions" J. Mathematical Analysis and Applications, 1971, vol. 33, pp. 82-95.

Scholkopf, et al., "Learning with Kernels", MIT Press, 2002.

Orr, et al. "Neural Networks: Tricks of the Trade", Springer, 1998.

Freund, et al. "An Efficient Boosting Algorithm for Combining Preferences" (1999) 9 pages.

Bromley, et al. "Signature Verification Using 'Siamese' Time Delay Nural Network." (1993) Advances in Pattern Recognition Systems Using Neural Network Technologies, World Scientific, pp. 25-44.

Burges, C. "Simplified Support Vector Decision Rules" (1996) International Conference on Machine Learning, pp. 71-77.

Dekel, et al. "Log-linear Models for Label-ranking" (2004) NIPS, 8 pages.

Harrington, E. "Online ranking/collaborative filtering Using Perceptron Algorithm" (2003) ICNL, 8 pages.

Hastie, et al. "Classification by Pairwise Coupling" (1998) NIPS, pp. 451-471.

Jarvelin, et al. "IR Evaluation Methods for Retieving Highly Relevant Documents" (2000) Proceedings of the 23rd annual ACM SIGIR, pp. 41-48.

Mason, et al. "Boosting Algorithms as Gradient Descent" (2000) NIPS 7 pages.

Burges, et al. "Learning to Rank Using Gradient Descent" (2005) ICML, 8 pages.

Caruana, et al. "Using the Future to 'Sort Out' the Present: Rankprop and Multitask Learning for Medical Risk Evaluation" (1996) NIPS, pp. 959-965.

Crammer, et al. "Pranking with Ranking" (2001) NIPS, 7 page.

U.S. Appl. No. 11/378,076, Burges, et al.

U.S. Appl. No. 11/066,514, Burges, et al.

Cohen, et al. "Volume Seedlings", 1992.

Jarvelin, et al. "Cumulated Gain-Based Evaluation of IR Techniques" 2002.

Storn, et al. "Differential Evolution—A Simple and Effcient Heuristic for Global Optimization over Continuous Spaces", 1996.

Storn. "On the Usage of Differential Evolution for Function Optimization", 2002.

Xia, et al. "A One-Layer Recurrent Neural Network for Support Vector Machine Learning", 2004.

C. Burges, "Ranking as Learning Structured Outputs", in Proceedings of the NIPS 2005 Workshop on Learning to Rank, Dec. 2005, 4 pages.

Refregier, et al. "Probabilistic Approach for Multiclass Classification with Neural Networks" (1991) Proceedings of the 1991 International Conference on Artificial Neural Networks (ICANN-91) 5 pages.

Herbrich, et al. "Large Margin Rank Boundaries for Ordinal Regression" (2000) Advances in Large Margin Classifiers, pp. 115-132.

Mitchell. "Machine Learning" New York: McGraw-Hill.

Andy Harter, et al., A Distributed Location System for the Active Office, IEEE Network, 1994, pp. 62-70.

Guanling Chen, et al., A Survey of Context-Aware Mobile Computing Research, Dartmouth Computer Science Technical Report, 2000, 16 pages.

William Noah Schilt, A System Architecture for Context-Aware Mobile Computing, Columbia University, 1995, 153 pages.

Mike Spreitzer, et al., Providing Location Information in a Ubiquitous Computing Environment, SIGOPS '93, 1993, pp. 270-283.

Marvin Theimer, et al., Operating System Issues for PDAs, In Fourth Workshop on Workstation Operating Systems, 1993, 7 pages.

Roy Want, Active Badges and Personal Interactive Computing Objects, IEEE Transactions on Consumer Electronics, 1992, 11 pages, vol. 38—No. 1.

Bill N. Schilit, et al., The ParcTab Mobile Computing System, IEEE WWOS-IV, 1993, 4 pages.

Bill Schilit, et al., Context-Aware Computing Applications, In Proceedings of the Workshop on Mobile Computing Systems and Applications, Dec. 1994. pp. 85-90.

Bill N. Schilit, et al., Customizing Mobile Applications, Proceedings USENIX Symposium on Mobile and Location Independent Computing, Aug. 1993, 9 pages.

Mike Spreitzer, et al., Architectural Considerations for Scalable, Secure, Mobile Computing with Location Information, In the 14th International Conference on Distributed Computing Systems, Jun. 1994, pp. 29-38.

Mike Spreitzer et al., Scalable, Secure, Mobile Computing with Location Information, Communications of the ACM, Jul. 1993, 1 page, vol. 36—No. 7.

Roy Want, et al., The Active Badge Location System, ACM Transactions on Information Systems, Jan. 1992, pp. 91-102, vol. 10—No. 1.

Mark Weiser, Some Computer Science Issues in Ubiquitous Computing, Communications of the ACM, Jul. 1993, pp. 75-84, vol. 36—No. 7.

M. Billinghurst, et al., An Evaluation of Wearable Information Spaces, Proceedings of the Virtual Reality Annual International Symposium, 1998, 8 pages.

Bradley J. Rhodes, Remembrance Agent: A continuously running automated information retrieval system, The Proceedings of the First International Conference on the Practical Application Of Intelligent Agents and Multi Agent Technology, 1996, pp. 487-495.

Eric Horvitz, et al., In Pursuit of Effective Handsfree Decision Support: Coupling Bayesian Inference, Speech Understanding, and User Models, 1995, 8 pages.

Bradley J. Rhodes, The Wearable Remembrance Agent: A System for Augmented Memory, The Proceedings of The First International Symposium on Wearable Computers, Oct. 1997, pp. 123-128.

Eric Horvitz, et al., Attention-Sensitive Alerting in Computing Systems, Microsoft Research, Aug. 1999.

Bill N. Schilit, et al., Disseminating Active Map Information to Mobile Hosts, IEEE Network, 1994, pp. 22-32, vol. 8—No. 5.

Mark Billinghurst, et al., Wearable Devices: New Ways to Manage Information, IEEE Computer Society, Jan. 1999, pp. 57-64.

Thad Eugene Starner, Wearable Computing and Contextual Awareness, Massachusetts Institute of Technology, Jun. 1999, 248 pages.

Bradley J. Rhodes, The Wearable Remembrance Agent: A System for Augmented Memory, Personal Technologies Journal Special Issue on Wearable Computing, 1997, 12 pages.

Workshop on Wearable Computing Systems, Aug. 19-21, 1996.

Mark Billinghurst, Research Directions in Wearable Computing, University of Washington, May, 1998, 48 pages.

Mark Weiser, The Computer for the 21st Century, Scientific American, Sep. 1991, 8 pages.

T. Joachims, Text categorization with support vector machines: learning with many relevant features, Machine Learning, European Conference on Machine Learning, Apr. 21, 1998, pp. 137-142.

International Search Report dated Sep. 29, 2003 for PCT Application Serial No. 00/20685, 3 pages.

Robert M. Losee, Jr., Minimizing information overload: the ranking of electronic messages, Journal of Information Science 15, Elsevier Science Publishers B.V., 1989, pp. 179-189.

OA Dated Jul. 11, 2008 for U.S. Appl. No. 11/066,514, 29 pages.

OA dated Dec. 9, 2008 for U.S. Appl. No. 11/066,514, 27 pages.

OA Dated December 11, 2008 for U.S. Appl. No. 11/378,086, 28 pages.

OA Dated Oct. 31, 2008 for U.S. Appl. No. 11/426,981, 31 pages.

OA Dated Oct. 31, 2008 for U.S. Appl. No. 11/426,985, 30 pages.

Joachims. "Optimizing Search Engines Using Clickthrough Data" ACM SIGKDD 02, Edmonton, Alberta, Canada. pp. 133-142. Last accessed Jun. 26, 2008, 10 pages.

OA dated Jun. 26, 2008 for U.S. Appl. No. 11/378,086, 27 pages.

* cited by examiner

Strollers, Baby Travel Systems, Prams, Jogging Strollers, Babies ...
... We proudly offer a HUGE selection of baby strollers, jogging strollers, prams, double and triple strollers and stroller accessories , PLUS a great selection of car seats ...
www.strollers.com  Cached page  11/10/2005

Strollers, Car Seats and Baby Strollers at Strollandgo.com
Strollers, Car Seats and Baby Strollers at Strollandgo.com. We have a wide variety of strollers selection to handle all your needs. New Strollers For 2006 Introducing Peg Perego , Bugaboo ...
www.strollandgo.com  Cached page

Baby Strollers And Jogging Strollers
Compare and save on baby strollers, joggers, child carriers, and baby carriages! Baby Strollers Compare and save on baby strollers and jogging strollers! Baby Strollers at eBay! A baby stroller is a ...
www.babystrollers.us  Cached page

Strollers Theatre
... Since 1958, Strollers Theatre has brought you entertaining and thoughtful theater. Critics constantly praise the high quality of acting, the inventive staging and the close-knit audience contact of ....
www.madstage.com/Companies/Strollers.html  Cached page juststrollers.com online store for children strollers
Just Strollers offers a full line of baby strollers, jogging strollers, bike trailers,. and classic carriages with Free Shipping. Mountain Buggy Maclaren Strollers Bob Jogging Strollers Combi ...
www.juststrollers.com  Cached page  11/10/2005

SPONSORED SITES

Strollers - Bargain Prices
Shop fast. Buy smart. Shopzilla for Strollers and other Baby...
www.shopzilla.com

Stroller
We make it easier than ever to travel with little ones. Simplify...
www.onestepahead.com

Strollers at Wal-Mart
Find Strollers and more Baby products at Wal-Mart. Graco. Fisher...
www.walmart.com

Stroller - Compare Prices
Before you buy, compare prices at Calibex. We have a wide range of...
www.calibex.com

Strollers at Sears Canada
Parenthood has never been easier. Get everything you need for the....
www.searsbaby.ca

FIG. 10

RANKING RESULTS USING MULTIPLE NESTED RANKING

CROSS-REFERENCE TO RELATED APPLICATION

This application is a continuation-in-part of a co-pending application assigned U.S. Ser. No. 11/066,514, filed on Feb. 25, 2005, and entitled SYSTEM AND METHOD FOR LEARNING RANKING FUNCTIONS ON DATA, the entirety of which is incorporated herein by reference.

BACKGROUND

Searching has become such an important feature of applications and operating systems for computer users. Even more so, it has turned into a highly profitable sector within the computing marketplace. On the one hand, advertisers are buying keywords and/or paying a premium for a desirable listing position when certain search terms are entered. On the other hand, consumers are primarily focused on the quality of the search and often select the search application or engine based on its past performance or reputation.

Most commonly, users initiate text searches to look for specific content on the Internet, on their network, or on their local PC. A search request can be submitted in a variety of formats. The user can use keywords, a phrase, or any combination of words depending on the content he/she is seeking and the location of the search. The task of a search engine is to retrieve documents that are relevant to the user's query. When several documents exist that relate to the same or similar terms, there must be some technique in place to present them to the user in an order that reflects the degree of their relevance to the query and to the user. Thus, ranking the retrieved documents may be the most challenging task in information retrieval. Since most users typically only look at the first few results at the top of the list (returned by the search engine), it has become increasingly important to achieve high accuracy for these results.

Conventional ranking systems continue to strive to produce good rankings but remain problematic. This is due in part to the massive number of documents that may be returned in response to a query. To put the problem into perspective, there are approximately 25 billion documents (e.g., websites, images, URLs) currently on the Internet or Web. Thus, it is feasible that thousands if not millions of documents may be returned in response to any one query. Despite attempts made by the current ranking systems to accurately rank such large volumes of documents, the top results may still not be the most relevant to the query and/or to the user. This occurs for several reasons. One reason may be that because such conventional ranking systems may try to improve low ranking results at the expense of highly ranked results, the relevance of the top returned results may be decreased. A second possible reason may be that using a single ranking algorithm to solve the whole problem (for all possible queries) may be too restrictive. Consequently, there remains a need to improve the rankings of retrieved items while minimizing the expense to the ranking system's performance.

SUMMARY

The following presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

The subject application relates to a system(s) and/or methodology that facilitate improving ranking results. In particular, the system and method apply a ranking technique in multiple nested stages to re-rank subsets of previously ranked items. Different ranking techniques can be employed in this manner but for purposes of discussion and brevity, one ranking technique will be discussed herein.

The system and method involve breaking the ranking task up into stages where the ranking technique is applied to decreasing subsets of the high or higher ranked items. Suppose the ranking technique employs a neural net that is trained to rank items. Multiple nets can be trained on smaller sets of information to yield a more relevant top number of items presented to the user. For example, imagine that a user has submitted a query to a search component. The search component may retrieve over a million items for the given query, where the items may correspond to documents, files, images, or URLs. A first neural net can be trained to order or rank this initial set of items. From the initial set of ranked items, take the top few (e.g., top 2500) results and train a second neural net that can be employed to reorder them. The second neural net can be trained using the modified set of items—in this case, the top 2500 items. Thereafter, the 2500 items can be re-ranked via the second neural net. From the re-ranked 2500 items, take a smaller subset of the high ranked items (e.g., top 1000) and train a third neural net to subsequently reorder them. After the top 1000 are re-ranked, a smaller subset of the top ranked items can be used to train another net—the top 100 for example. The top 100 can be re-ranked in a similar manner to yield a top 10 which can be re-ranked as well. The overall effect is to re-rank the top 2500 results in separate stages, which effectively increases the overall ranking performance of the search component. Most users may only review the top few results returned for a given query. By using the above system and method, the top few results are re-ranked repeatedly to improve their relevancy and ranking order. The improvement from using such a staging system may result, in part, from the fact that at each stage, the learning machine used at that stage only has to learn a small sub-problem of the overall ranking problem that is being solved. A second advantage of the staging system is due to the fact that for some applications (such as Web search), results must be returned in real time. Thus, if only a single algorithm is used to perform the ranking, then that algorithm must be very fast. However in the staging approach, each problem involves much less data, and so more sophisticated (and slower) ranking methods may be applied at each stage.

To the accomplishment of the foregoing and related ends, certain illustrative aspects of the invention are described herein in connection with the following description and the annexed drawings. These aspects are indicative, however, of but a few of the various ways in which the principles of the invention may be employed and the subject invention is intended to include all such aspects and their equivalents. Other advantages and novel features of the invention may become apparent from the following detailed description of the invention when considered in conjunction with the drawings.

BRIEF DESCRIPTION OF THE DRAWINGS

FIG. 10 is an exemplary user interface that demonstrates the modified search result as presented to a user in response to a query.

DETAILED DESCRIPTION

Figure 1:
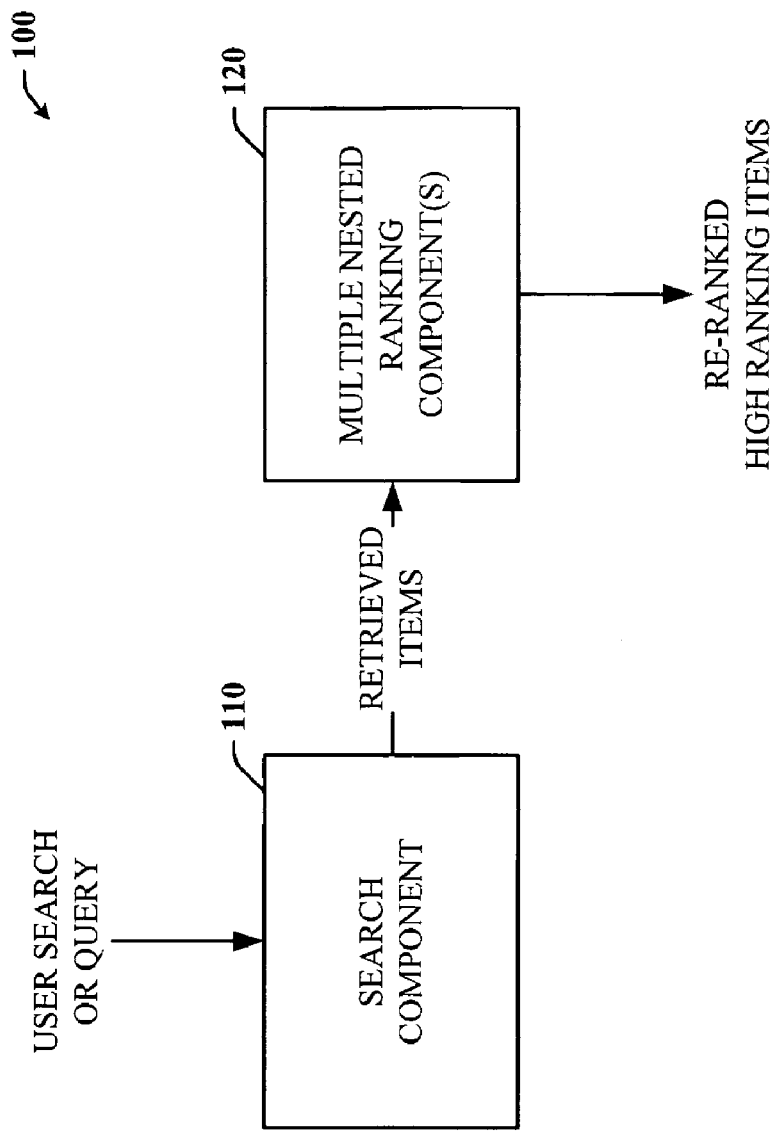
FIG. 1 is a block diagram of a ranking system that facilitates improving the rankings of items returned for a given query by re-ranking high ranked items.

The subject systems and/or methods are now described with reference to the drawings, wherein like reference numerals are used to refer to like elements throughout. In the following description, for purposes of explanation, numerous specific details are set forth in order to provide a thorough understanding of the systems and/or methods. It may be evident, however, that the subject systems and/or methods may be practiced without these specific details. In other instances, well-known structures and devices are shown in block diagram form in order to facilitate describing them.

As used herein, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and a computer. By way of illustration, both an application running on a server and the server can be a component. One or more components may reside within a process and/or thread of execution and a component may be localized on one computer and/or distributed between two or more computers.

The subject systems and/or methods can incorporate various inference schemes and/or techniques in connection with recognizing and identifying optimum subsets of high ranked items at each stage for re-ranking using the multiple nested ranking approach. In particular, the optimum subset of high ranked items selected for re-ranking can change for each query submitted by the user based on the number of items retrieved. For example, the top 1500 items may be initially re-ranked at a first stage and at a second stage, the top 250 items from the prior re-ranked items can be chosen for another re-ranking. In other queries, the system may determine that a different breakdown of decreasing subsets of items is more appropriate. That is, such inference schemes or artificial intelligence can be employed to automatically make these determinations based on the number of items retrieved and/or in conjunction with user preferences. The apparent relevance of the items retrieved can also be factored into the decision making process. For instance, relevance may be evaluated according to a value assigned to an item. This value can be utilized to ascertain a threshold in terms of which items should be considered as the high ranked items. Thus, an inference scheme can determine whether to re-rank the top 100 or the top 50 out of 1000 ranked items, for example, at a particular stage for the given query. At a subsequent stage, a smaller subset of items may be selected to undergo further re-ranking (e.g., top 10 out of 100 items). This can be repeated until the user is left with the top ranked item. Selecting the number of stages to conduct the re-ranking can also be facilitated by utilizing one or more various inference schemes. It should be noted, however, that for each choice of size of subset to rerank, a ranking algorithm must be trained offline.

As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Ranking items retrieved in response to a user's query such that the item most relevant to the user appears at the top of the results list remains a relatively problematic task for most conventional search engines. Various solutions involving machine learning algorithms have been presented to solve this problem, however most are applied to the full set of the per query results to learn their ranking. Unfortunately, it is a very difficult task to learn how to rank a very large number of documents for any possible query.

The subject application as described in FIGS. 1-8 below makes use of a machine learning approach to learn a ranking with high accuracy with respect to the top of the results list. More specifically, a multiple nested ranking approach can be employed to perform re-ranking in stages (e.g., one or more), at each stage generating a new distribution of the results. The way the new distribution is created can be based on obtaining a good ranking of the few documents or items at the very top of the ranked list. The training set for each subsequent stage is pruned to include only the results that are ranked high by the previous ranker. This splits the problem into smaller and easier subtasks and learns the ranking for each of the stages separately. In addition, since the subtasks are smaller, more sophisticated (and slower) ranking algorithms can be applied. The assumption is that the basic ranker already produces a good ranking and that relevant documents are placed near the top of the ranked list. Thus, the aim of each following ranker is to learn only the re-ranking of the high scoring results.

Furthermore, it is reasonable to assume that relevant documents which are placed at the bottom of the ranked list tend to be more difficult to learn, and thus unlikely for the ranking algorithm or module to improve their rank significantly. Hence, each training set can be pruned to exclude such difficult relevant items from the training set so that the learning can concentrate on ranking (or re-ranking) the items at the top of the list.

There are many different ranking models that can be utilized to accomplish the re-ranking of high ranked items in stages. For the sake of brevity and ease of discussion, the subject application will be described in conjunction with a neural net algorithm described in Burges et al., "Learning to Rank Using Gradient Descent", Proceedings of the $22^{nd}$ International Conference on Machine Learning, Bonn, 2005. This algorithm will be referred to as RankNet. In conventional practice, a neural net can be trained by presenting labeled examples to the input, forward propagating through the net, computing a value of an error function based on the outputs of the net and the desired outputs obtained from the labeled data, and finally adjusting the weights incrementally so as to reduce the value of the error function (e.g., when averaged over all the training data).

The neural net algorithm discussed herein (see e.g., U.S. Ser. No. 11/066,514 as referenced above) involves the learning of ranked datasets to minimize a cost which is a function of pairs of examples. In particular, this neural net can learn a ranking of a set of data points through the use of pairs of examples and learn a function on pairs that assigns a higher value to the example with the higher relevance score. This neural net ranking algorithm can be applied at each stage (e.g., one or more stages) of the multiple nested ranker. The algorithm is trained on pairs of examples and its outputs are used to produce the final ranking of the data points. A back-propagation phase can be adapted to the cost function based on pair-wise errors. Modification of the training set which is done at each stage of the multiple nested ranker can be viewed as an attempt to introduce the information about the position of the documents in the ranked list into the training procedure and put more weight on learning the ordering of the high scoring results.

The multiple nested ranker approach presented herein facilitates partitioning the ranking problem into smaller and more manageable tasks. That is, instead of handling a million retrieved items at once, a top subset of the million is focused in on to improve the rankings of just the top subset. Hence, after each stage, a new distribution of the results can be generated so that the learning algorithm focuses on re-ranking the top results. The performance of the ranker is measured using the set of results at the top of the ranked list rather than pair-wise accuracy. Therefore, this approach also can bridge the gap between the cost function used during the training and the evaluation measure by putting more emphasis on learning how to re-rank high scoring documents. The multiple nested ranking approach is further described with respect to FIGS. 1-8.

Referring now to FIG. 1, there is a general block diagram of a ranking system 100 that facilitates improving the rankings of items returned for a given query by re-ranking high ranked items. The system 100 includes a search component 110 that retrieves an initial set of items for the given query. For example, suppose that a user has performed a search for "childhood illnesses and antibiotics". The search component 110 can retrieve a plurality of items that are relevant to those search terms. The retrieved items can then be employed as a first training set for a multiple nested ranking component 120. The multiple nested ranking components 120 can rank or re-rank one or more decreasing subsets of high ranked items to facilitate obtaining the most relevant items at the top of a search result list.

The multiple nested ranking components 120 can include a plurality of neural nets. Each neural net is trained separately using a training set of items to learn ranking. More specifically, in RankNet, referred to above, each neural net can learn ranking using a probabilistic cost function based on pairs of examples. During training, the neural net is shown a pair of examples in the order whereby, for instance, the first example shown is desired to be ranked higher than the second example; and the cost function used to update the net depends on the net's outputs for both examples. For instance, suppose that sample A is given an input for the net, followed by sample B; and assume that it is desired to have the net rank sample A higher than sample B. If the net outputs a lower number for A than B, then the cost is large and the net updates its weights accordingly—to reduce this cost. Moreover, during the training phase, it can be assumed that the first example is always or almost always ranked higher than the second example. However, during the testing phase, the neural net can map single examples to a number which is then used to rank the data.

The initial set of items retrieved in response to the query can be ranked in this manner. From this ranked list of items, a subset of the high ranked items can be re-ranked by training another neural net using this subset of items. In practice for example, imagine that out of 100,000 (ranked) results, the system takes the top 2500 items and performs a number of re-ranking iterations on decreasing subsets of the 2500 items. As a result, the top 10 items (from the top 2500 items) can be re-ranked and/or re-shuffled one or more times depending on the number of re-ranking stages performed. Thus, comparing the item at the top position in the list at stage=0 (prior to re-ranking) and then at stage=3 (after 3 nested iterations) may or may not yield different items. In some cases, however, the item in the top position may have changed at least once.

Figure 2:
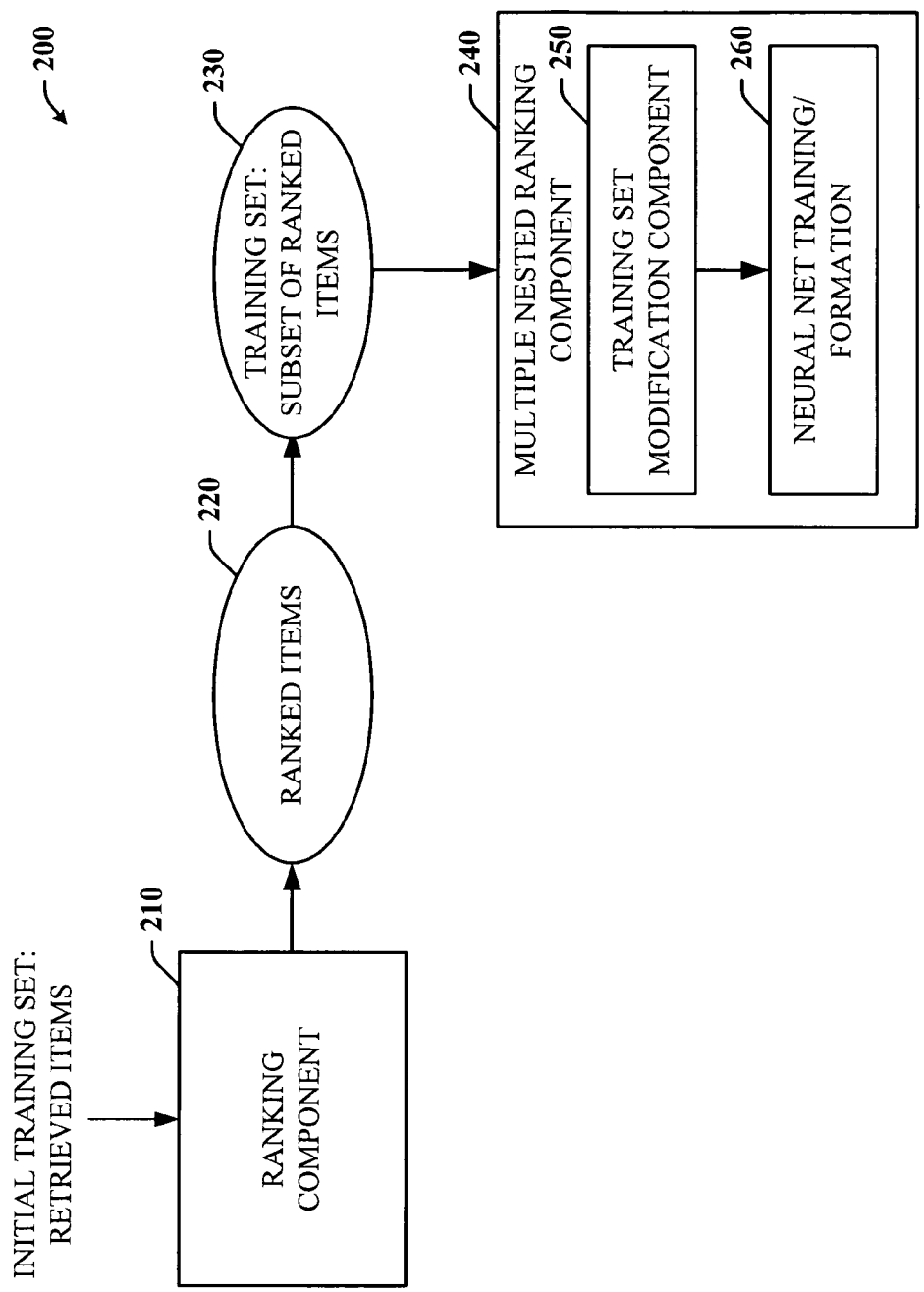
FIG. 2 is a block diagram of a ranking system that facilitates improving the rankings of items returned for a given query by re-ranking high ranked items using a multiple nested ranking approach.

Referring now to FIG. 2, there is a block diagram of a ranking system 200 that facilitates improving the rankings of items returned for a given query by re-ranking high ranked items using a multiple nested ranking approach. In particular, the system 200 includes a ranking component 210 that receives an initial training set of data (e.g., items retrieved in response to a query). The ranking component 210 can learn ranking using a probabilistic cost function based on pairs of samples. More specifically, the ranking component 210 can employ a learning algorithm that is given a set of pairs of samples [A,B] in $R^d$ together with the target probabilities $\overline{P}_{AB}$ that sample A is to be ranked higher than sample B. With models of the form $f: R^d \mapsto R$, the rank order of a set of samples is specified by the real values taken by $f$, more specifically, it is assumed that $f(x_1) > f(x_2)$ means that the model ranks $x_1$ higher than $x_2$. The map from the outputs to probabilities are modeled using a logistic function $$\overline{P}_{ij} \equiv \frac{e^{\overline{o}_{ij}}}{1 + e^{\overline{o}_{ij}}},$$

where $\overline{o}_{ij} = f(x_i) - f(x_j)$ and $\overline{P}_{ij} = \text{Prob}(x_i$ is ranked higher than $x_j)$. A cost function can also be employed with the neural nets to learn the ranking. The cost function can become a function of the difference of the outputs of two consecutive training samples: $f(\overline{o}_2 - \overline{o}_1)$, assuming that the first sample has a higher or the same rank as the second sample.

Thus, the ranking component 210 can provide ranked items 220, whereby a subset of the ranked items can be utilized as a new or modified training set 230. This new training set can be provided to a multiple nested ranking component 240 in which at each stage, the training set can be decreasingly modified by way of a training set modification component 250. As a new or modified training set is created, it can be used in neural net training 260 to create a neural net for the given subset of items at the particular stage.

Figure 3:
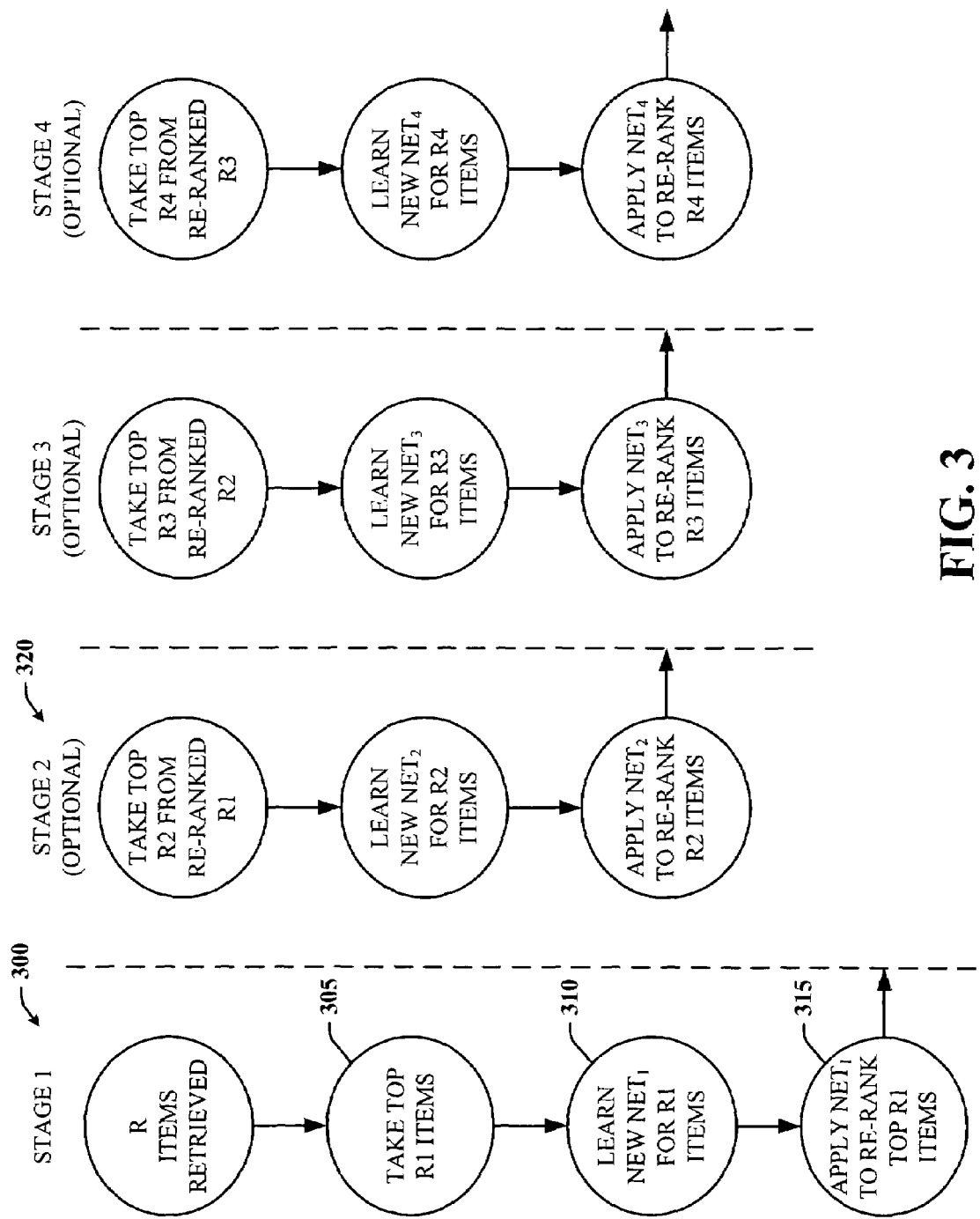
FIG. 3 is a block diagram that demonstrates ranking items using a multiple nested ranking approach to facilitate placing the most relevant items for a given query at or near the top of a search results list.

FIG. 3 schematically demonstrates the re-ranking of high ranked items by applying a ranking function or model in stages for subsets of items to facilitate placing the most relevant items for a given query at or near the top of a search results list. A user or search and retrieval system can determine the number of stages and/or the number of (high ranked) items to re-rank at each stage. As shown in FIG. 3, selected high ranked items can be re-ranked in one or more stages, whereby at each successive stage, the subset of items re-ranked is reduced from the previous subset of items. In practice, for instance, imagine that there is a set of training queries $Q=(q_1, \ldots, q_{|Q|})$; and that for each query $q_i$ there is a set of documents that were ranked among the top R1 results (out of R items retrieved) by the basic ranker used in a search engine, $D_i=(d_{i1}, \ldots, d_{iR1})$. The information about the ranking of these items (for example, their scores) may also be used as inputs for the subsequent stages of ranking.

The multiple nested ranking approach applies the ranking algorithm (e.g., ranking component in FIGS. 1 and 2) to re-rank the top results in one or more stages. At each stage the ranking component/algorithm/function is presented with a new distribution of the per query results containing decreasing subsets of the high ranked items. Thus, after each stage, the training set is pruned in the following way: at the first stage 300, the ranking function is applied to the whole set of the top R1 results 305, where R1=2500 documents (e.g., objects, files, URLs, images, etc.) per query, for instance. The training procedure computes the first net, $Net_1$ (310). The results can be sorted by decreasing score computed using $Net_1$ (315). After that, the training set is modified so that only the top R2 documents that receive the highest scores according to $Net_1$ remain for each query.

The second stage 320 produces $Net_2$ and only the R3 top scoring documents are kept for the next training set. This pruning procedure can be referred to as telescoping, which amounts to fixing the $Net_1$, ranks of the documents at ranks from R1 to (R2-1) after the first stage, re-ranking the top R2 documents with $Net_2$, again fixing the ranks of the documents placed from the ranked R2 to (R3-1) after the second stage, re-ranking the top R3 results with $Net_3$, and so on (e.g., STAGE 3, STAGE 4, etc.). Thus, after each stage of the multiple nested ranking, a ranked list for all R1 results per query is produced that can be used for the evaluation. The number of stages and items in each stage can vary. Therefore, for one query, four stages with R1=2500, R2=1000, R3=100, R4=10 can be used and in another query, three stages with R1=2500, R2=100, R3=10 can be used. It should be appreciated that the number of items at each stage can be different from those in the previous example as long as they appear in decreasing subsets. A similar or the same telescoping procedure can be applied to the validation and test sets.

As depicted above in the exemplary scenario, this approach splits the problem into smaller pieces so that each net has a smaller and simpler task to perform. In addition, the pruning of the data set removes presumably difficult relevant documents at the bottom of the ranked list from the training set and forces the algorithm to concentrate on the ranking of the high scoring relevant documents.

Recall that the cost function of the ranking algorithm that we have described for exemplary purposes depends on the difference of the outputs of two consecutive training samples. As described herein, samples are documents or other items returned by the search engine in response to a particular query. Subsequently, after each iteration, the outputs of the net for the training samples generate their ranking relative to the query. Due to the current form of the cost function, the ranking algorithm tries to learn the correct pair-wise ordering of the documents regardless of their position in the ranked list. Hence, it is possible that during training, the net improves the pair-wise error by significantly moving up documents that are at the bottom of the list even at the price of slightly moving down some of the relevant results at the top of the list. Experimental data have demonstrated that this indeed can happen during training.

Figure 4:
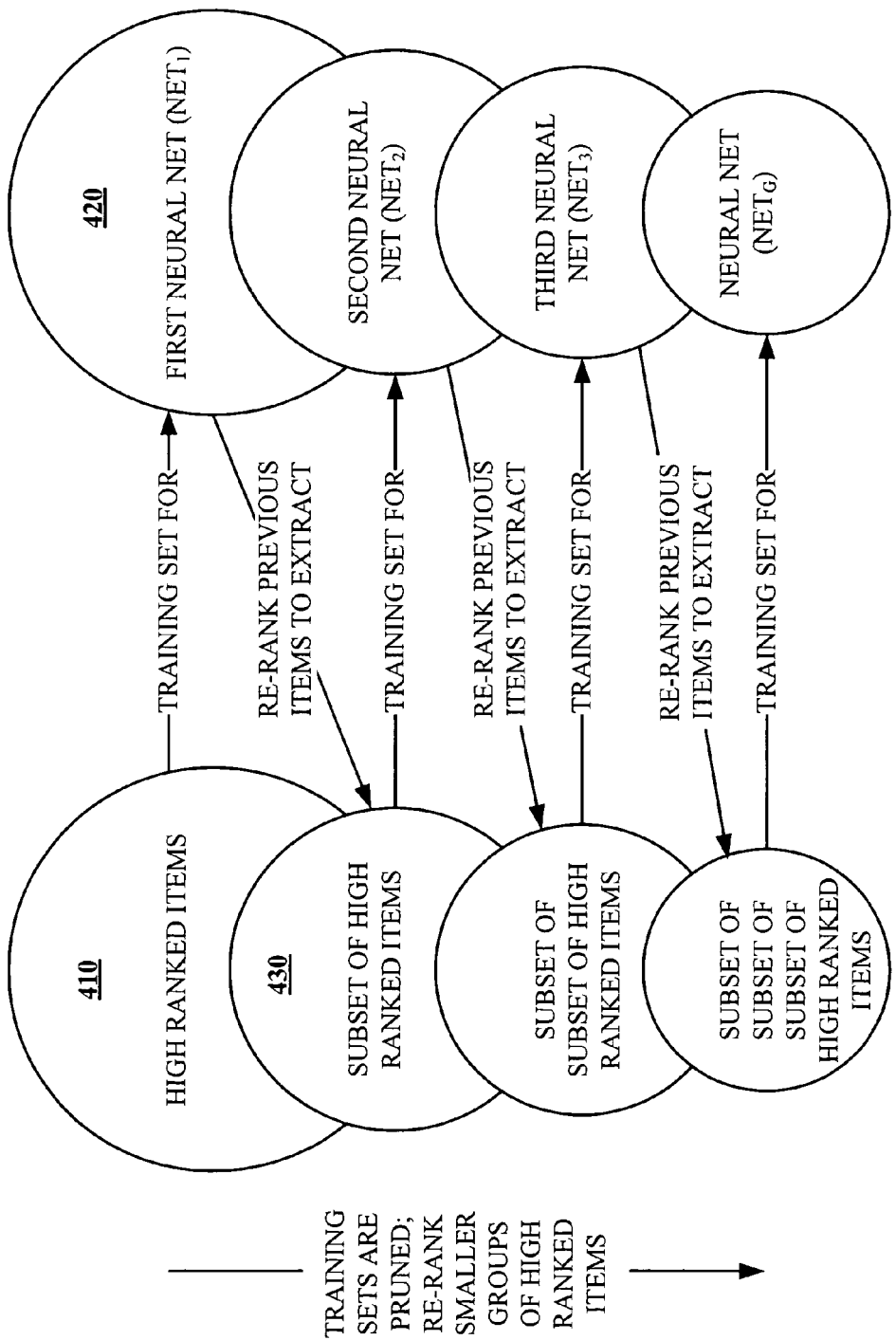
FIG. 4 is a block diagram that illustrates the telescoping approach to ranking items, and in particular, the relationship between decreasing subsets of high ranked items and their use in training of and interaction with nested neural nets.

Turning now to FIG. 4, there is a block diagram that illustrates the telescoping approach to ranking items, and in particular, the relationship between decreasing subsets of high ranked items and their use in training of and interaction with nested neural nets. The diagram demonstrates the telescoping aspect of taking an initial set of high ranked items and then pruning each successive subset thereof. The neural nets used to rank the items can be successively modified as well based on such subsets. As a result of the telescoping nature of the ranking, the more relevant items in a search result list are re-ranked in order to obtain the most relevant items at the top of the list.

As shown in the figure, an initial set of high ranked items 410 (taken from a list of items retrieved by a search component and then ranked) can be used to train a first neural net 420. The trained neural net 420 can then be applied to the items 410 in order to obtain a successive subset of high ranked items 430. This can continue for as many iterations as the user desires to facilitate fine-tuning the items at the top of the search results list. This is depicted in FIG. 4 where neural $net_G$ (G is an integer greater than or equal to 1) can be trained by a corresponding modified training set.

Various methodologies will now be described via a series of acts. It is to be understood and appreciated that the subject system and/or methodology is not limited by the order of acts, as some acts may, in accordance with the subject application, occur in different orders and/or concurrently with other acts from that shown and described herein. For example, those skilled in the art will understand and appreciate that a methodology could alternatively be represented as a series of inter-related states or events, such as in a state diagram. Moreover, not all illustrated acts may be required to implement a methodology in accordance with the subject application.

Figure 5:
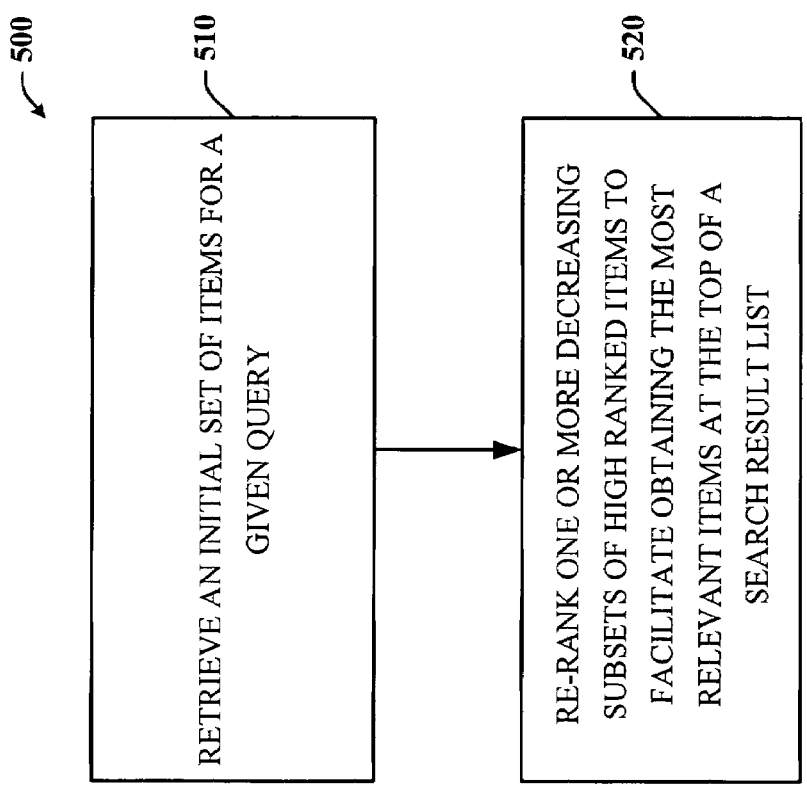
FIG. 5 is a flow diagram illustrating an exemplary methodology that facilitates improving the rankings of items returned for a given query by re-ranking high ranked items.

Referring now to FIG. 5, there is a flow diagram illustrating an exemplary method 500 that facilitates improving the rankings of items returned for a given query by re-ranking high ranked items. The method 500 involves retrieving an initial set of items for a given query by way of a search component at 510. This set of items can be ranked using any ranking function or algorithm to obtain an initial ranking of the items. Following at 520, the method 500 can re-rank one or more decreasing subsets of the high ranked items to facilitate positioning the most relevant items to the query at the top of a search results list. Once the desired re-ranking of items is performed, the list of search results can be presented to the user. Thus, imagine that 500,000 items are returned in response to the user's query. Rather than trying to improve the rankings of the lower ranked items (e.g., near the bottom of the list or below a threshold value), the method concentrates its efforts on the high ranked items. Consequently, the top 3000 items on the list could be selected. As a result, nested groups of the top 3000 items are re-ranked in a successive manner, such that the current ranking of an item can be determined in part by the previous ranking.

Figure 6:
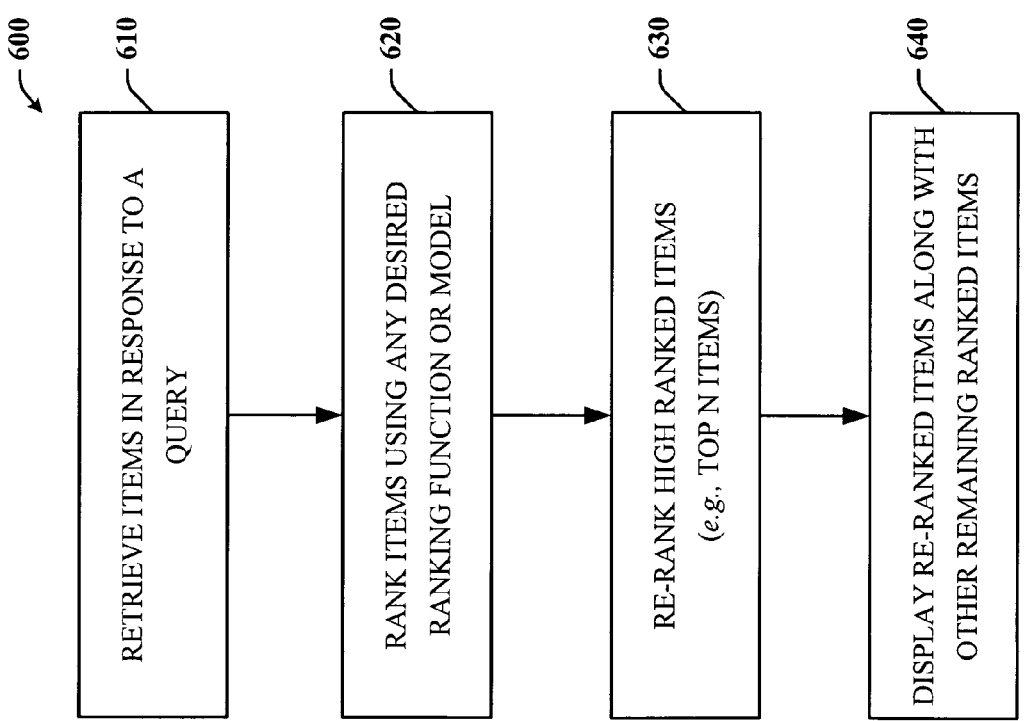
FIG. 6 is a flow diagram illustrating an exemplary methodology that facilitates improving the rankings of items returned for a given query by re-ranking high ranked items using a multiple nested ranking approach.

Turning to FIG. 6, there is a flow diagram illustrating an exemplary method 600 that facilitates improving the rankings of items returned for a given query by re-ranking high ranked items using a multiple nested ranking approach. The method 600 involves retrieving a plurality of items in response to a query at 610. At 620, the items can be ranked using any desired ranking function or model. To improve the rankings of the higher ranked items (e.g., top V items, where V is an integer greater than one), the higher ranked items can be re-ranked at 630 using a multiple nested ranking approach. That is, the same or a similar ranking function can be applied to the higher ranked items in stages (e.g., in decreasing subsets of items) rather than to the whole group of items at once. For instance, the top 2500 items can be taken and re-ranked to yield a new order of the top 2500 items. Subsequently, the top 100 items can be taken and re-ranked to yield a new order of the top 100 items—meanwhile the rankings of the remaining 2400 items (ranked lower than the top 100) remain unchanged. If desired, yet another stage of re-ranking can be performed on the top 10 items, for example. At 640, the re-ranked items and the remaining items retrieved by a search component can be presented to the user.

Figure 7:
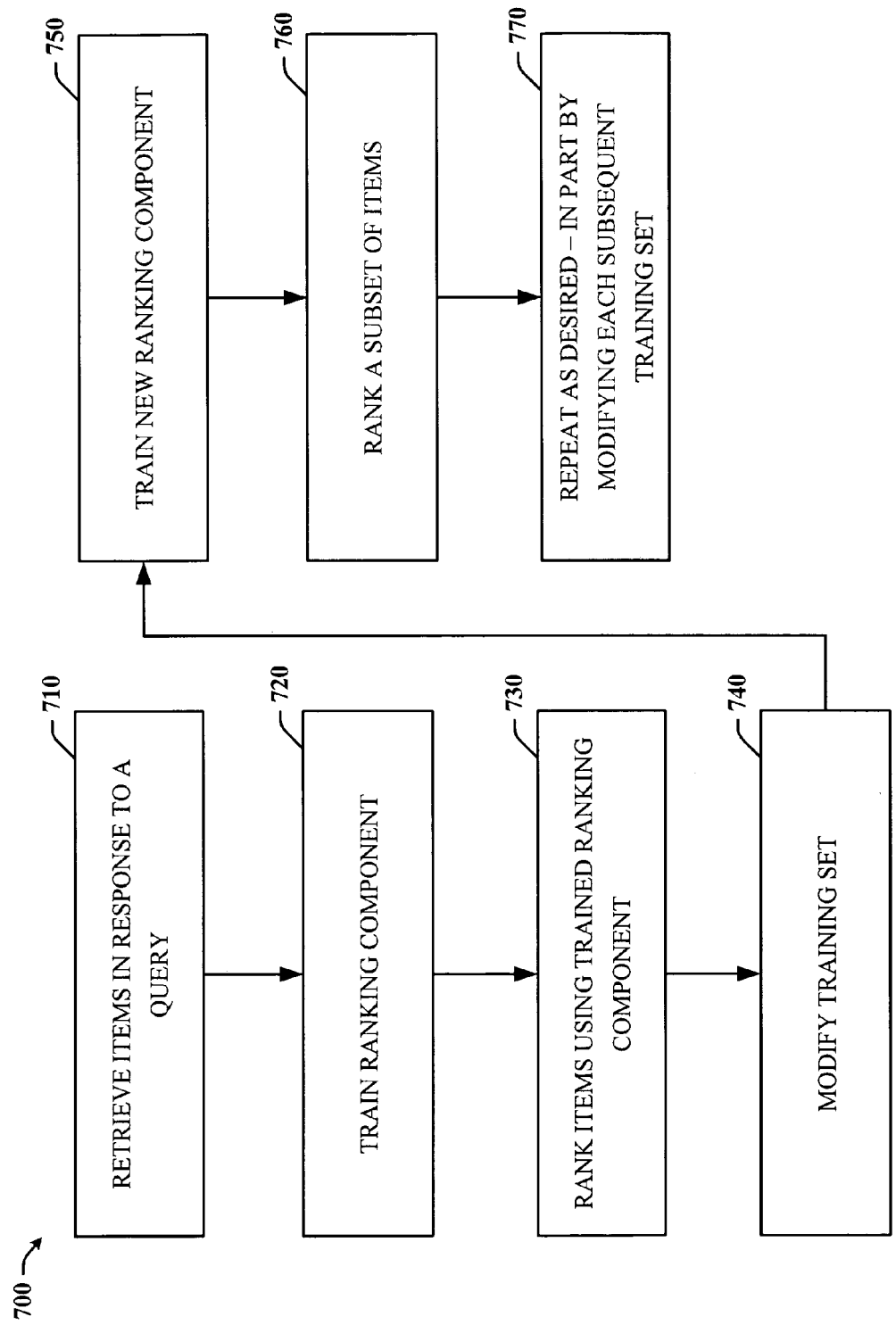
FIG. 7 is a flow diagram illustrating an exemplary methodology that facilitates improving the rankings of items returned for a given query by pruning or modifying training sets which are individually and successively used to train corresponding ranking components.
Figure 8:
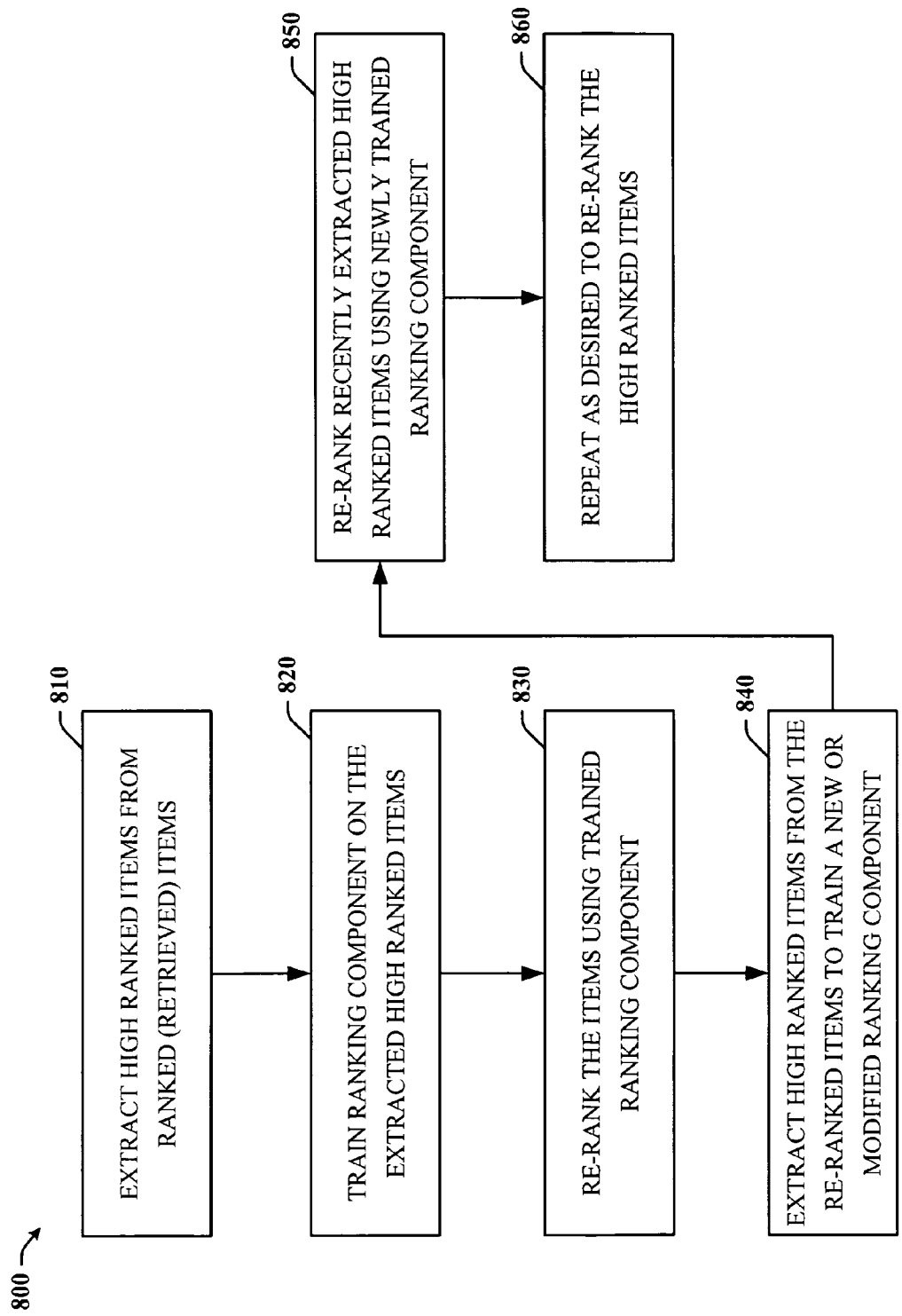
FIG. 8 is a flow diagram illustrating an exemplary methodology that facilitates improving the rankings of items returned for a given query by re-ranking decreasing subsets of high ranked items using a multiple nested ranking approach.

In FIGS. 7 and 8 below, it should be appreciated that the methods (700, 800) described are applicable to any ordering problem where accuracy in ranking of the top items (or more generally some subset of the items) is more important than the rankings elsewhere. Search engines are one of many examples of application where this is true, and there does not necessarily need to be a query involved.

Referring now to FIG. 7, there is a flow diagram illustrating an exemplary method 700 that facilitates improving the rankings of items returned for a given query by pruning or modifying training sets which are individually and successively used to train corresponding ranking components. The method 700 involves retrieving items in response to a query at 710 by way of a search component or engine. At 720, the ranking component can be computed or trained using a training set. The items retrieved by the search component can be ranked using the ranking component at 730. At 740, the training set can be modified or pruned by excluding the lower ranked items (e.g., low scoring items whose relevance is more difficult to determine). As a result, the ranking component can focus on ranking the more relevant high scoring items. At 750, a new or modified ranking component can be trained using the modified training set. The remaining items (e.g., those not excluded) can be ranked again by the modified ranking component at 760. The processes occurring at 740 to 760 can be repeated as desired whereby decreasing subsets of high ranked items are re-ranked by their corresponding modified training sets.

In FIG. 8, there is a flow diagram illustrating an exemplary method 800 that facilitates improving the rankings of items returned for a given query by re-ranking decreasing subsets of high ranked items using a multiple nested ranking approach. The method 800 involves extracting high ranked items from a list of ranked items that have been retrieved for a given query at 810. For instance, imagine taking the top 1000 documents out of 2 million documents retrieved. At 820, a ranking component (e.g., machine learned neural net) can be trained on the (extracted) high ranked items. Hence, the top 1000 items are employed as the training set. At 830, these items can be re-ranked by the recently trained ranking component. This means that any information from the 2 million documents retrieved via a search component are not considered in this re-ranking process. At 840, a subset of the re-ranked high ranked items can be extracted to again modify the training of the ranking component. So imagine now taking the top 100 items from the re-ranked 1000 item list and using the top 100 items as a new or modified training set to retrain the ranking component. Then at 850, the 100 items can be re-ranked by the modified ranking component. This can be repeated again by now taking the top 10 items from the 100 item list and re-ranking them in a similar manner. As can be seen, the top 10 items on the list can be repeatedly reordered in each stage.

Figure 9:
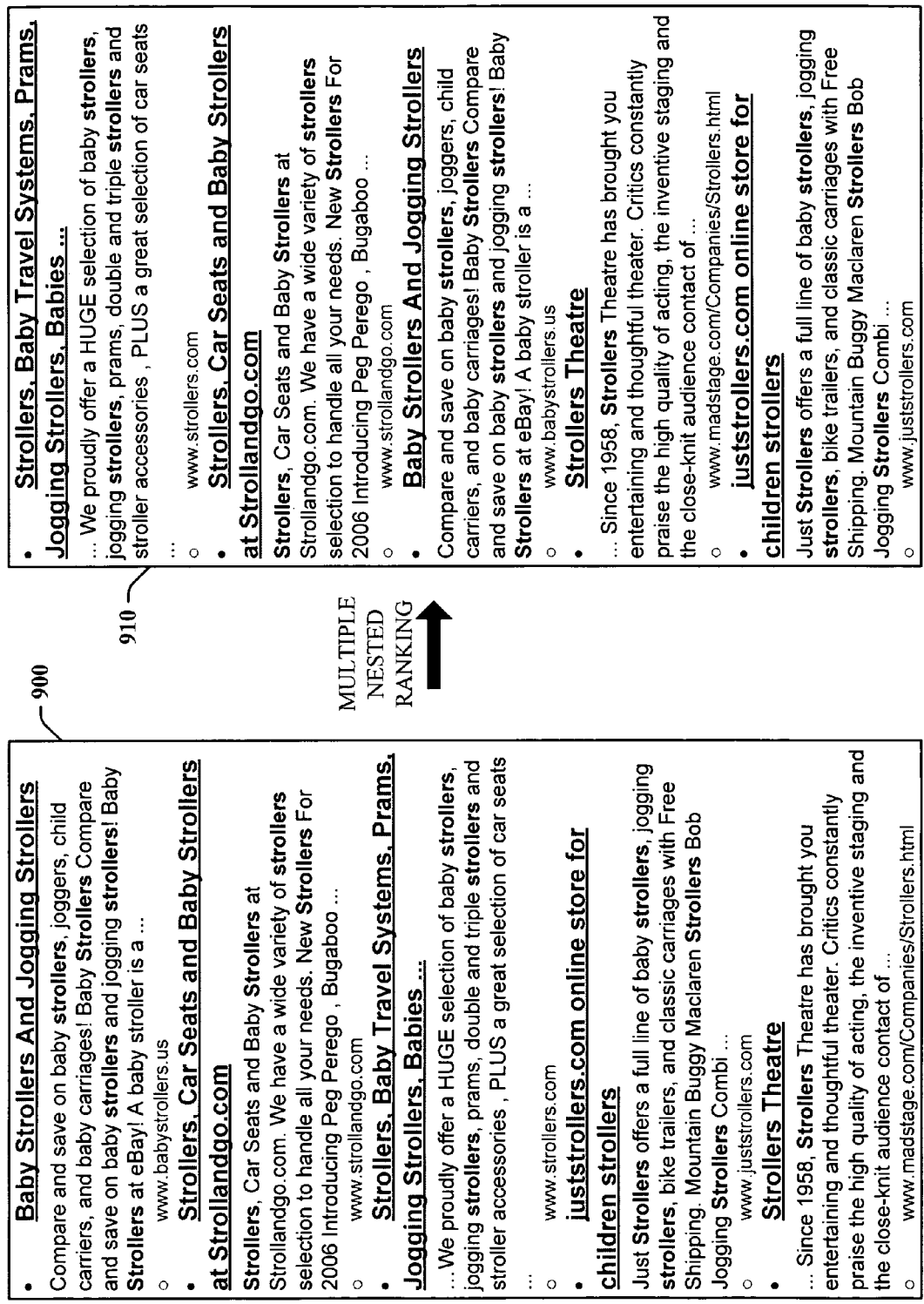
FIG. 9 is a diagram that demonstrates on a very small scale the reordering of a subset of high ranked items from a set of items retrieved by a search component.

Turning now to FIG. 9, the illustration demonstrates on a very small scale the re-ranking of search results, and in particular, to the re-ranking of the high ranked items. Imagine that a user has entered a Web query for "strollers" and many items have been returned and then ranked. Block 900 provides a list of the top 5 items resulting from this ranking. To obtain an improved ordering of the top 5 items (e.g., URLs), the multiple nested approach can be employed to reorder the items in stages (e.g., one or more stages). On a more practical scale, the system may be handling 2.5 million retrieved items for this query, and thus working on the re-ordering of the top 5000 items to ultimately improve the ordering of the top 10 items and/or the top item can be quite advantageous to the user. Hence, after re-ranking the items, the new order of the 5 items is obtained (910). The final results list can then be presented to the user as shown in FIG. 10. The processing time consumed by the multiple nesting ranking component is negligible and substantially unnoticeable to the user; and the improved accuracy in providing the most relevant item at the top of the results list greatly increases user satisfaction with the search component.

Figure 11:
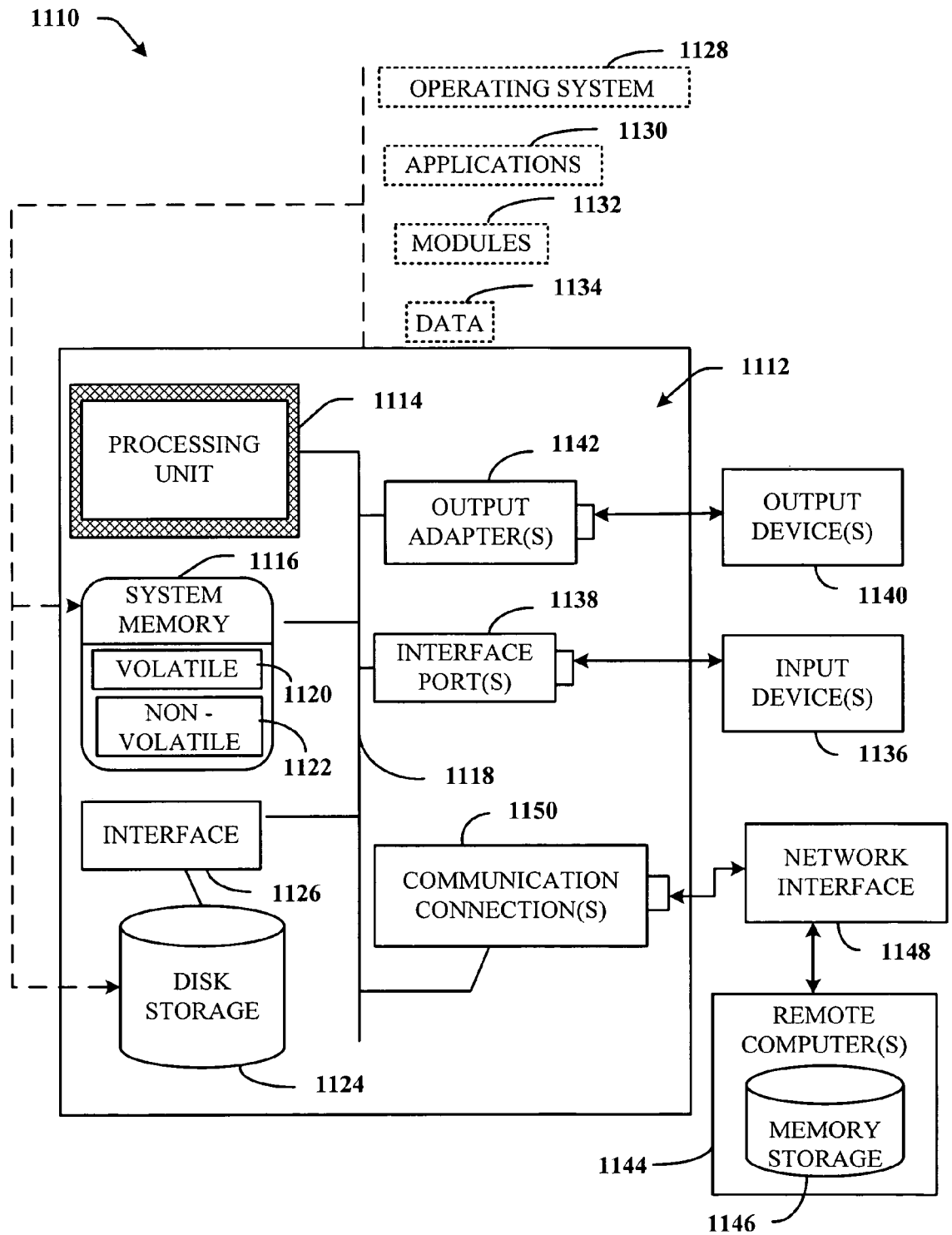
FIG. 11 illustrates an exemplary environment for implementing various aspects of the invention.

In order to provide additional context for various aspects of the subject application, FIG. 11 and the following discussion are intended to provide a brief, general description of a suitable operating environment 1110 in which various aspects of the subject application may be implemented. While the system(s) and/or method(s) is described in the general context of computer-executable instructions, such as program modules, executed by one or more computers or other devices, those skilled in the art will recognize that the invention can also be implemented in combination with other program modules and/or as a combination of hardware and software.

Generally, however, program modules include routines, programs, objects, components, data structures, etc. that perform particular tasks or implement particular data types. The operating environment 1110 is only one example of a suitable operating environment and is not intended to suggest any limitation as to the scope of use or functionality of the system and/or method. Other well known computer systems, environments, and/or configurations that may be suitable for use with the system and/or method include but are not limited to, personal computers, hand-held or laptop devices, multiprocessor systems, microprocessor-based systems, programmable consumer electronics, network PCs, minicomputers, mainframe computers, distributed computing environments that include the above systems or devices, and the like.

With reference to FIG. 11, an exemplary environment 1110 for implementing various aspects of the system and/or method includes a computer 1112. The computer 1112 includes a processing unit 1114, a system memory 1116, and a system bus 1118. The system bus 1118 couples system components including, but not limited to, the system memory 1116 to the processing unit 1114. The processing unit 1114 can be any of various available processors. Dual microprocessors and other multiprocessor architectures also can be employed as the processing unit 1114.

The system bus 1118 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MCA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 1116 includes volatile memory 1120 and nonvolatile memory 1122. The basic input/output system (BIOS), containing the basic routines to transfer information between elements within the computer 1112, such as during start-up, is stored in nonvolatile memory 1122. By way of illustration, and not limitation, nonvolatile memory 1122 can include read only memory (ROM), programmable ROM (PROM), electrically programmable ROM (EPROM), electrically erasable ROM (EEPROM), or flash memory. Volatile memory 1120 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1112 also includes removable/nonremovable, volatile/nonvolatile computer storage media. FIG. 11 illustrates, for example a disk storage 1124. Disk storage 1124 includes, but is not limited to, devices like a magnetic disk drive, floppy disk drive, tape drive, Jaz drive, Zip drive, LS-100 drive, flash memory card, or memory stick. In addition, disk storage 1124 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1124 to the system bus 1118, a removable or non-removable interface is typically used such as interface 1126.

It is to be appreciated that FIG. 11 describes software that acts as an intermediary between users and the basic computer resources described in suitable operating environment 1110. Such software includes an operating system 1128. Operating system 1128, which can be stored on disk storage 1124, acts to control and allocate resources of the computer system 1112. System applications 1130 take advantage of the management of resources by operating system 1128 through program modules 1132 and program data 1134 stored either in system memory 1116 or on disk storage 1124. It is to be appreciated that the subject system and/or method can be implemented with various operating systems or combinations of operating systems.

A user enters commands or information into the computer 1112 through input device(s) 1136. Input devices 1136 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1114 through the system bus 1118 via interface port(s) 1138. Interface port(s) 1138 include, for example, a serial port, a parallel port, a game port, and a universal serial bus (USB). Output device(s) 1140 use some of the same type of ports as input device(s) 1136. Thus, for example, a USB port may be used to provide input to computer 1112 and to output information from computer 1112 to an output device 1140. Output adapter 1142 is provided to illustrate that there are some output devices 1140 like monitors, speakers, and printers among other output devices 1140 that require special adapters. The output adapters 1142 include, by way of illustration and not limitation, video and sound cards that provide a means of connection between the output device 1140 and the system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. The remote computer(s) 1144 can be a personal computer, a server, a router, a network PC, a workstation, a microprocessor based appliance, a peer device or other common network node and the like, and typically includes many or all of the elements described relative to computer 1112. For purposes of brevity, only a memory storage device 1146 is illustrated with remote computer(s) 1144. Remote computer(s) 1144 is logically connected to computer 1112 through a network interface 1148 and then physically connected via communication connection 1150. Network interface 1148 encompasses communication networks such as local-area networks (LAN) and wide-area networks (WAN). LAN technologies include Fiber Distributed Data Interface (FDDI), Copper Distributed Data Interface (CDDI), Ethernet/IEEE 1102.3, Token Ring/IEEE 1102.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1150 refers to the hardware/software employed to connect the network interface 1148 to the bus 1118. While communication connection 1150 is shown for illustrative clarity inside computer 1112, it can also be external to computer 1112. The hardware/software necessary for connection to the network interface 1148 includes, for exemplary purposes only, internal and external technologies such as, modems including regular telephone grade modems, cable modems and DSL modems, ISDN adapters, and Ethernet cards.

What has been described above includes examples of the subject system and/or method. It is, of course, not possible to describe every conceivable combination of components or methodologies for purposes of describing the subject system and/or method, but one of ordinary skill in the art may recognize that many further combinations and permutations of the subject system and/or method are possible. Accordingly, the subject system and/or method are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A ranking system that provides improved rankings for items returned for a given query comprising:
    a processor;
    a memory communicatively coupled to the processor, the memory having stored therein computer-executable instructions to implement the system, including:
        an initial set of items for which an ordering thereof is desired; and
        a multiple nested ranking component that ranks the initial set of items by employing a plurality of ranking stages, wherein a first stage provides a first ranking of the initial set of items and each subsequent stage after the first stage ranks a highest ranked subset of the set of items from a previous ranking stage immediately preceding the subsequent ranking stage, wherein the number of items in the subset decreases at each stage, wherein each stage employs one of a plurality of trained ranking algorithms, wherein each subsequent stage employs a trained ranking algorithm from the plurality of trained ranking algorithms that is a more sophisticated ranking algorithm that is slower to rank items, and requires more processing time than a trained ranking algorithm employed by the previous ranking stage; and
    wherein at least one trained ranking algorithm includes a learning algorithm that is given a set of pairs of items [$x_i$, $x_j$] with probability $\overline{P}_{ij}$ that item $x_i$ is to be ranked higher than item $x_j$, and a ranking model f , where $f(x_i) > f(x_j)$ indicates that the ranking model ranks $x_i$, higher than $x_j$, $$\overline{P}_{ij} \equiv \frac{e^{\overline{o}_{ij}}}{1+e^{\overline{o}_{ij}}},$$

where ranking model output $\overline{o}_{ij} = f(x_i) - f(x_j)$.

2. The system of claim 1, the plurality of ranking algorithms trained via machine learning or statistical methods.

3. The system of claim 2, the plurality of ranking algorithms comprising:
at least an initial ranking algorithm trained to rank the initial set of items; and
one or more subsequent ranking algorithms subsequently trained on ranked subset of items taken from a previous re-ranked subsets of items from a previous ranking algorithm.

4. The system of claim 3, a first subset of items comprises items in the highest order positions in a ranking.

5. The system of claim 2, further comprises a training set modification component that successively prunes each previous training set in part by excluding one or more lowest ranked items from each training set to form a new training set, each new training set comprises a subset of the items from the previous training set.

6. The system of claim 2, the plurality of ranking algorithms are trained in a successive manner using a corresponding training set.

7. The system of claim 1, the multiple nested ranking component employs artificial intelligence to determine the number of items in each subset at each stage.

8. The system of claim 1, further comprises a display component that presents a search result list to the user, the search result list comprising at least a subset of items that have been reordered based upon the ranking determined by multiple nested ranking component.

9. A method that provides improved rankings for items returned for a given query comprising:
employing a processor executing computer executable instructions embodied on a computer readable storage medium to perform the following acts:
retrieving an initial ranked ordered set of items, wherein each item is assigned a relevance value; and
iteratively re-ranking, conducted via at least one trained ranking algorithm, one or more subsets of the set of items, wherein each subset comprises a plurality of ranked items from the previous iteration that are not below a threshold relevance value, the number of items in the subset decreases at each iteration, wherein the threshold relevance value is automatically selected by artificial intelligence based upon the number of items in the set of items, wherein each iteration employs a ranking algorithm that is slower to rank items than a ranking algorithm employed to rank items in a previous iteration; and
wherein the at least one trained ranking algorithm includes a learning algorithm that is given a set of pairs of items $[x_i, x_j]$ with probability $\overline{P}_{ij}$ that item $x_i$ is to be ranked higher than item $x_j$ and a ranking model f, where $f(x_i) > f(x_j)$ indicates that the ranking model ranks $x_i$ higher than $x_j$, $$\overline{P}_{ij} \equiv \frac{e^{\overline{o}_{ij}}}{1 + e^{\overline{o}_{ij}}},$$

where ranking model output $\overline{o}_{ij} \equiv f(x_i) - (x_j)$.

10. The method of claim 9, wherein the number of iterations of re-ranking is automatically selected based upon an inference scheme.

11. The method of claim 9, the re-ranking comprises employing one or more modified ranking algorithms that have been trained, the training comprising:
receiving an initial set of training data;
employing the training data to train an initial ranking algorithm;
employing the initial ranking algorithm to rank the training data into ranked training data;
iteratively training the one or more modified ranking algorithms, comprising:
selecting a subset of the ranked training data that have a highest ranking to train a modified ranking algorithm, wherein the subset comprises a number of items that is less than the entire set of ranked training data;
training the modified ranking algorithm using the subset of ranked training data;
employing the modified ranking algorithm to rank the subset of training data into ranked training data.

12. The method of claim 11, determining the number of modified ranking algorithms based upon user preference or artificial intelligence.

13. The method of claim 9, further comprises presenting a list to the user, the list comprising a subset of items that have been re-ranked.

14. The method of claim 9, the re-ranking employs a plurality of ranking algorithms, wherein each successive iteration employs a more complex ranking algorithm that achieves improved ranking.

15. A ranking system that provides improved rankings for items returned for a given query comprising:
a processor;
a memory communicatively coupled to the processor, the memory having stored therein computer-executable instructions to implement the system, including:
a means for retrieving an initial ordered set of items for the given query; and
a means for iteratively re-ranking, conducted via at least one trained ranking algorithm, one or more subsets of the set of items to facilitate obtaining the most relevant ordering of the items, wherein each subset comprises a plurality of higher ranked items from the previous iteration, the number of items in a subset decreases at each iteration, wherein each iteration employs a ranking algorithm that is slower to rank items than a ranking algorithm employed to rank items in a previous iteration, wherein the at least one trained ranking algorithm includes a learning algorithm that is given a set of pairs of items $[x_i, x_j]$ with probability $\overline{P}_{ij}$ that item $x_i$ is to be ranked higher than item $x_j$ and a ranking model f, where $f(x_i) > f(x_j)$ indicates that the ranking model ranks $x_i$ higher than $x_j$, $$\overline{P}_{ij} \equiv \frac{e^{\overline{o}_{ij}}}{1 + e^{\overline{o}_{ij}}},$$

where ranking model output $\overline{o}_{ij} \equiv f(x_i) - (x_j)$.

16. The system of claim 15, further comprises a means for modifying training sets to facilitate separately training the plurality of trained ranking algorithms.

17. The system of claim 15, further comprising a means for presenting a list of ordered items, the list comprising at least a subset of items that have been re-ranked.

* * * * *